(12) United States Patent
Ladell et al.

(10) Patent No.: US 6,173,693 B1
(45) Date of Patent: Jan. 16, 2001

(54) CYLINDER HEAD

(75) Inventors: Godwin Ladell, Cologne; Heinrich Z Krzykowski, Herdecke; Matthias Kraemer, Mösheim; Patrick Philips, Cologne, all of (DE)

(73) Assignee: Ford Global Technologies, Inc., Dearborn, MI (US)

( * ) Notice: Under 35 U.S.C. 154(b), the term of this patent shall be extended for 0 days.

(21) Appl. No.: 09/288,172

(22) Filed: Apr. 8, 1999

(30) Foreign Application Priority Data

Apr. 21, 1998 (EP) .................................................. 98107220

(51) Int. Cl.⁷ ........................................................ F02D 5/00
(52) U.S. Cl. .................. 123/305; 123/193.3; 123/188.14
(58) Field of Search .................................. 123/305, 302, 123/298, 193.3, 193.5, 188.14

(56) References Cited

U.S. PATENT DOCUMENTS

| | | | |
|---|---|---|---|
| 4,760,821 | 8/1988 | Aupor et al. | 123/308 |
| 4,958,604 | 9/1990 | Hashimoto | 123/276 |
| 5,394,845 | * 3/1995 | Noh et al. | 123/188.14 |
| 5,724,927 | 3/1998 | Suzuki | 123/90.15 |
| 5,727,521 | 3/1998 | Engel | 123/308 |
| 5,785,028 | * 7/1998 | Anderson et al. | 123/193.3 |
| 5,913,297 | * 6/1999 | Jingu | 123/295 |
| 5,915,353 | * 6/1999 | Matsumura | 123/188.14 |
| 6,006,719 | * 12/1999 | Matsumura | 123/302 |

FOREIGN PATENT DOCUMENTS 0 666 409 A1   2/1995   (EP) .

* cited by examiner

*Primary Examiner*—Henry C. Yuen
*Assistant Examiner*—Hieu T. Vo
(74) *Attorney, Agent, or Firm*—Jerome R. Drouillard

(57) ABSTRACT

A cylinder head has an intake port with an intake valve for selectively closing the intake port at an end thereof at an intake valve seat. The intake port has a substantially circular cross section in an area adjacent the intake valve seat. The intake port cross section transitions from the substantially circular cross-section at the intake valve seat, into a substantially oblong cross-section.

14 Claims, 1 Drawing Sheet

CYLINDER HEAD

FIELD OF THE INVENTION

The invention relates to a cylinder head designed to accommodate a plurality of intake valves per cylinder, more particularly a cylinder head for spark ignition engines intended to operate on the direct injection principle. partially in conjunction with a lean combustion process.

BACKGROUND OF THE INVENTION

EP 0666 409 A1 discloses a cylinder head designed to be provided with two intake valves per cylinder. Fuel is injected via an injector having its discharge orifice arranged approximately centrally between an intake valve seat and an outlet valve seat.

Arranging the inlet and outlet ports and accommodating the valves, injector and spark plug constitutes a problem especially in internal combustion engines with small cylinder bore.

According to the invention, it is proposed to shift the injector seat (lead-through position) away from the centers of the intake valve ports to an outwardly offset position, this being done on a cylinder head having intake ports which are circular in shape in the area of the intake valve seats. Thus, the discharge orifice of the injector will no longer lie on the radius of the circle passing through the centers of the circular intake valve seam, but on a larger radius. The benefit of this solution is that the circular intake valve seats can be arranged closer together, or can be made sufficiently large despite the fairly small cylinder bore.

According to one preferred embodiment of the invention, the separate intake ports originating front the circular intake valve seats assume a non-circular, and specifically oblong, cross-section following an area of transition. This arrangement permits an improved intake flow, particularly with a view to preventing the cylinder wall from being wetted with fuel droplets if an early injection timing is used.

Moreover, this design allows the injector to be arranged in part between the ports, so that the port routing and the alignment of the injector become largely independent of each other.

According to a further preferred embodiment, the centerlines of the intake ports of a given cylinder are spaced further apart in the area of oblong cross-section than in the area of the intake valve seats. This gives the designer more room to accommodate the injector.

According to a further preferred embodiment, the centerline of the injector, in its horizontal projection (see FIG. 2), intersect the centerline of the intake ports. This implies that the injector discharge orifice lies below the centerline of the intake ports whereas the injector mounting orifice on the outside of the cylinder head may be located above the intake port opening. Assuming that the intake ports are essentially straight in their area of oblong cross-section, the injector centerline will thus be at a larger angle to the cylinder head gasket surface than the centerline of the intake ports in their area of oblong cross-section. More specifically, the injector centerline is at an angle of approximately 45° to said cylinder head gasket surface. In terms of the alignment of the intake port, injector and one valve, the injector is arranged approximately on the bisectrix of the angle between the intake valve and intake port.

This arrangement provides a high degree of flexibility for achieving an optimized charge flow and carburetion inside the combustion chamber.

According to a further preferred embodiment, at least one of the intake ports is provided with a device which allows the intake flow to be variably controlled (and/or permits the creation of a swirl and/or tumble flaw, respectively).

BRIEF DESCRIPTION OF THE DRAWING

The invention is explained in more detail below. referring to FIGS. 1 and wherein:

FIG. 1 shoves a plan view of a cylinder head section with two cylinder bores;

DETAILED DESCRIPTION OF PREFERRED EMBODIMENTS

Figure 1:
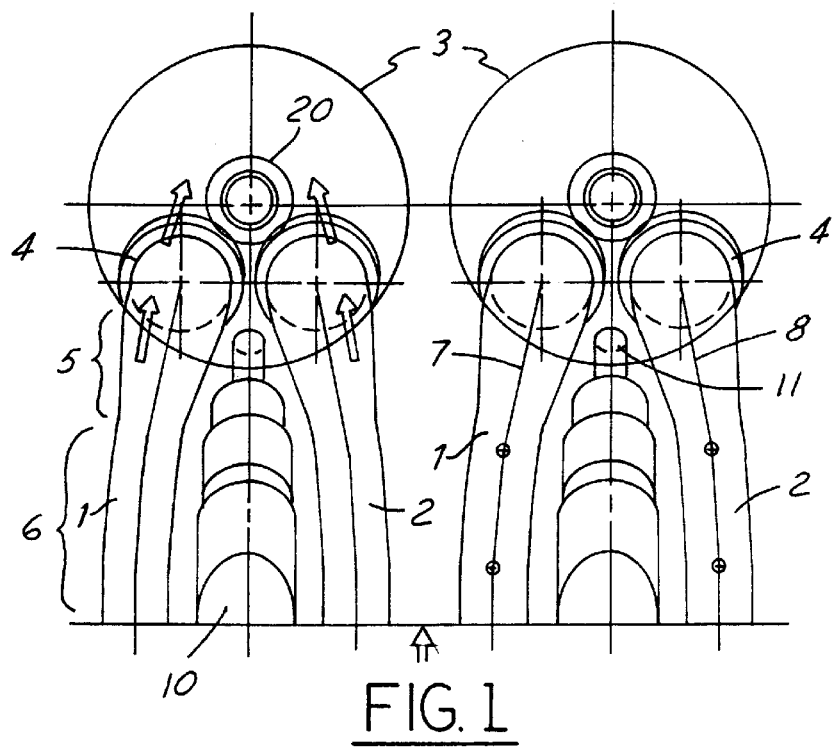

As shown In FIG. 1, the intake ports 1,2 for the cylinder bores 3 are of circular cross-section in the area of the intake valve seats 4. After a transition area 5, there follows a portion 6 in which the cross-section of the intake ports is oblong in shape (Refer to FIG, 2, dimensions A and B). In the area of the longitudinally extended portion 6 in which the intake ports exhibit such oblong cross-section, the centerlines 7,8 of the intake ports are spaced further apart than in the area of the intake-valve seats 4. The seat for the injector 10 is arranged in such a manner between the intake ports 1,2 that the exit orifice 11 for said injector lies on a radius (related to the cylinder bore) which is larger than the radius of the circle passing through the centers of the intake valve seats. The bore 20 for the spark plug is arranged in a slightly off-center position.

Figure 2:
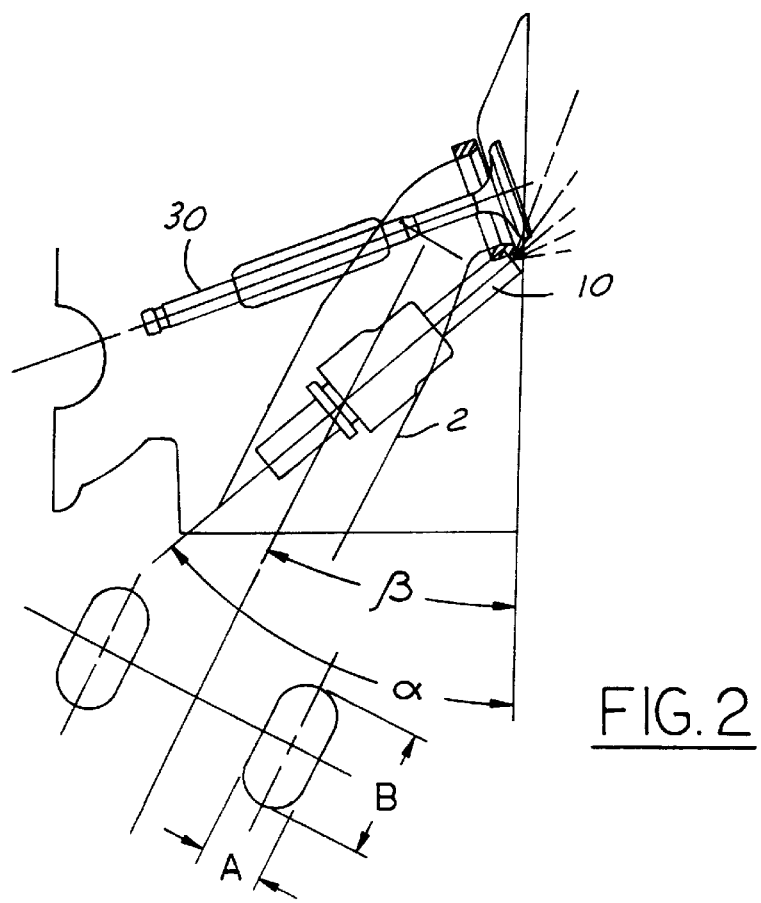
FIG. 2 shows a side elevation (horizontal projection) of a cylinder head section serving one cylinder.

Turning now to FIG. 2, the horizontal projection of the injector centerline intersects the centerline of the intake port. The injector 10 is arranged at an angle α which is larger than the angle β, related to the cylinder head plane facing the combustion chamber. Related to the position of one intake valve, the injector is mounted approximately on the bisectrix of the angle between the intake valve 30 and the intake port 1,2.

What is claimed is:

1. A cylinder head having an intake port with an intake valve for selectively closing the intake port at an end thereof at an intake valve seat, the intake port having a substantially circular cross section in an area adjacent the intake valve seat, the cylinder head comprising:

the substantially circular cross-section of the intake port being arranged at the intake valve seat, the cross-section transitioning into a substantially oblong cross-section;

a plane having a portion of the centerlines of the ports lying therein; and a fuel injector disposed along an injector axis, a horizontal projection of the injector axis intersecting the plane.

2. A cylinder head as set forth in claim 1, further comprising:

the intake ports extending substantially along the plane in the portion of the ports having the substantially oblong cross-section, and the cylinder head having a surface facing a combustion chamber defining a first angle between the surface and the injector axis and a second angle between the surface and the plane, the second angle being less than the first angle.

3. A cylinder head as set forth in claim 2, further comprising the intake valve having an axis, the intake valve axis and surface defining a third angle, the third angle being greater than the first angle.

4. A cylinder head as set forth in claim 2, wherein the injector axis is arranged approximately on the bisectrix of an angle defined by the intake valve axis and the plane.

5. A cylinder head as set forth in claim 2, further comprising a fuel injector provided in said cylinder head adjacent the intake valve ports, the injector disposed along an injector axis, and the injector axis being disposed outwardly from the centerlines of the ports at the valve seats.

6. A cylinder head having an intake port with an intake valve for selectively closing the intake port at an end thereof at an intake valve seat, the intake port having a substantially circular cross section in an area adjacent the intake valve seat, the cylinder head comprising:

the substantially circular cross-section of the intake port being arranged at the intake valve seat, the cross-section transitioning into a substantially oblong cross-section; and a second intake port, the first and second intake ports having a first and second centerline, respectively, and a first distance between the intake port centerlines at the intake valve seats and a second distance between the centerlines at the oblong cross section, wherein the second distance is larger than the first distance.

7. A cylinder head as set forth in claim 6, further comprising a fuel injector provided in said cylinder head adjacent the intake valve ports, the injector disposed along an injector axis, and the injector axis being disposed outwardly from the centerlines of the ports at the valve seats.

8. A cylinder head as set forth in claim 6 further comprising:

a plane containing a portion of the centerlines of the ports; and a fuel injector disposed along an injector axis, a horizontal projection of the injector axis intersecting the plane.

9. A cylinder head having a first and second intake port, with a first and second intake valve disposed along a first and second valve axis, respectively, the valves selectively closing the intake ports, respectively, at an end thereof at a respective intake valve seat, the intake ports each having a substantially circular cross section in an area adjacent the intake valve seats, an injector having an axis outwardly offset from the axes of the intake valves, the cylinder head comprising:

the substantially circular cross sections of the intake ports being arranged at the intake valve seats, the cross-sections transitioning into substantially oblong cross-sections; and the first and second intake ports having a first and second centerline, respectively, and a first distance between the intake port centerlines at the intake valve seats and a second distance between the centerlines at the oblong cross section, wherein the second distance is larger than the first distance.

10. A cylinder head as set forth in claim 9 further comprising:

a plane having a portion of the centerlines of the ports lying therein; and a fuel injector disposed along an injector axis, a horizontal projection of the injector axis intersecting the plane.

11. A cylinder head as set forth in claim 10, further comprising:

the portion of the intake ports having the substantially oblong cross-section extending substantially along the plane, and the cylinder head having a surface facing a combustion chamber defining a first angle between the surface and the injector axis and a second angle between the surface and the plane, the second angle being less than the first angle.

12. A cylinder head as set forth in claim 11, further comprising the intake valve having an axis, the intake valve axis and surface defining a third angle, the third angle being greater than the first angle.

13. A cylinder head as set forth in claim 12, wherein the injector axis is arranged approximately on the bisectrix of an angle defined by the intake valve axis and the plane.

14. A cylinder head having an intake port with an intake valve for selectively closing the intake port at an end thereof at an intake valve seat, the intake port having a substantially circular cross section in an area adjacent the intake valve seat, the cylinder head comprising:

the substantially circular cross-section of the intake port being arranged at the intake valve seat, the cross-section transitioning into a substantially oblong cross-section;

a fuel injector provided in said cylinder head adjacent the intake valve port, the injector disposed along an injector axis, and the injector axis being disposed outwardly from a center of the intake valve seat.

* * * * *